Oct. 7, 1924.

M. W. MUEHLHAUSER

MINING MACHINE

Filed Feb. 13, 1922

INVENTOR:
MARTIN W. MUEHLHAUSER
BY
ATTORNEY

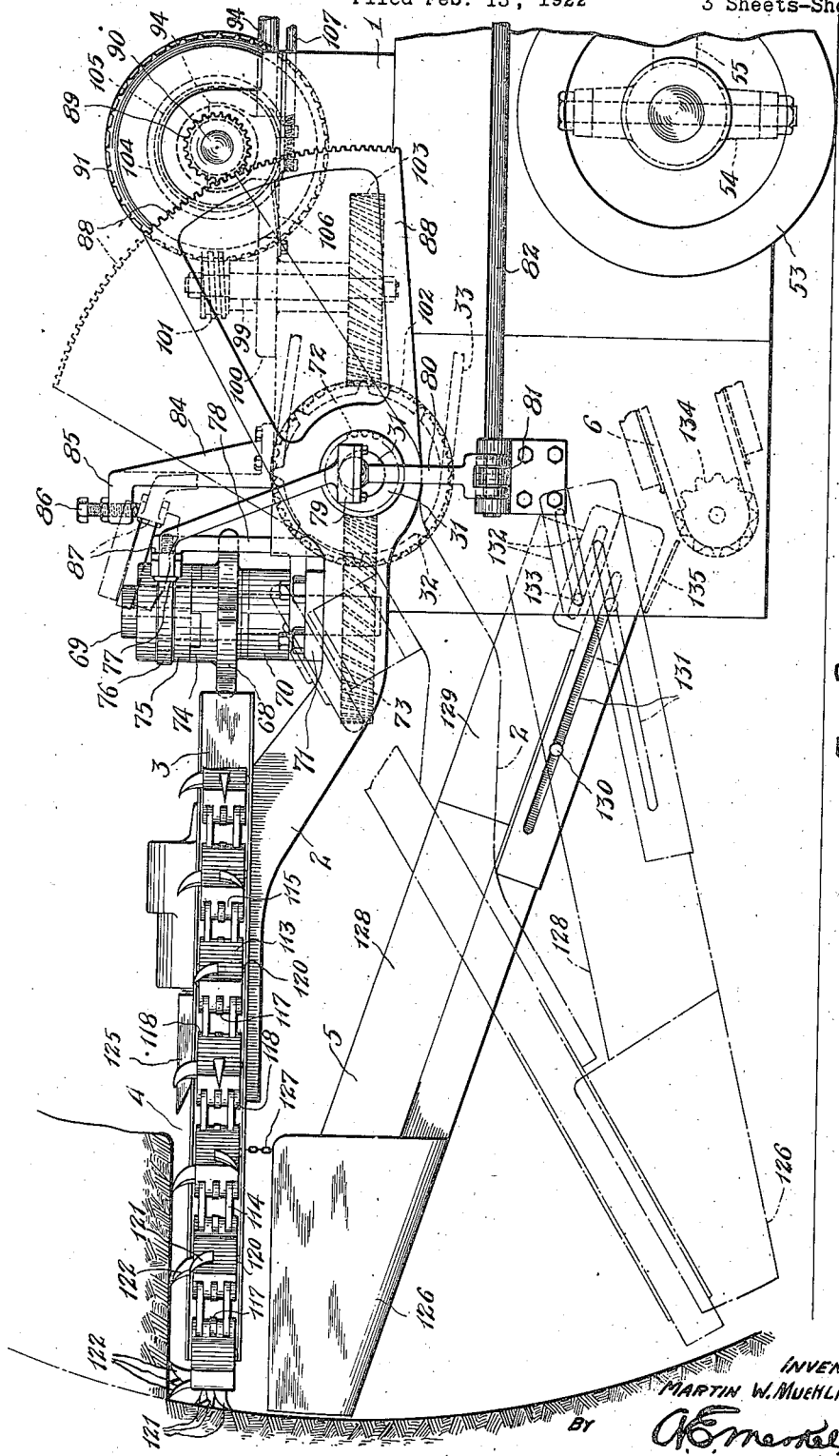

Patented Oct. 7, 1924.

1,510,490

UNITED STATES PATENT OFFICE.

MARTIN W. MUEHLHAUSER, OF CLEVELAND, OHIO, ASSIGNOR OF FIFTY-FIVE ONE-HUNDREDTHS TO SHERMAN W. SCHOFIELD, OF CLEVELAND, OHIO.

MINING MACHINE.

Application filed February 13, 1922. Serial No. 535,985.

*To all whom it may concern:*

Be it known that I, MARTIN W. MUEHLHAUSER, a citizen of the United States, resident of Cleveland, county of Cuyahoga, and State of Ohio, have invented new and useful Improvements in Mining Machines, of which the following is a specification, the principle of the invention being herein explained and the best mode in which I have contemplated applying that principle, so as to distinguish it from other inventions.

My invention relates to mining machines and has for its object to provide a machine capable of removing coal directly from the wall of the mine in lumps of substantial size and further to deliver the coal so removed to the rear of the machine for removal from the mine.

The annexed drawings and the following description set forth in detail certain means embodying my invention, the disclosed means, however, constituting but one of the various mechanical forms in which the principle of the invention may be employed.

In said annexed drawings:

Fig. 3 is a side elevation of the forward portion of the machine.

Fig. 4 is a detail plan view of the driving motor and gearing and controlling clutches for driving the various parts of the machine.

Figs. 5 and 6 are detail views of the cutter chain.

Figure 1:
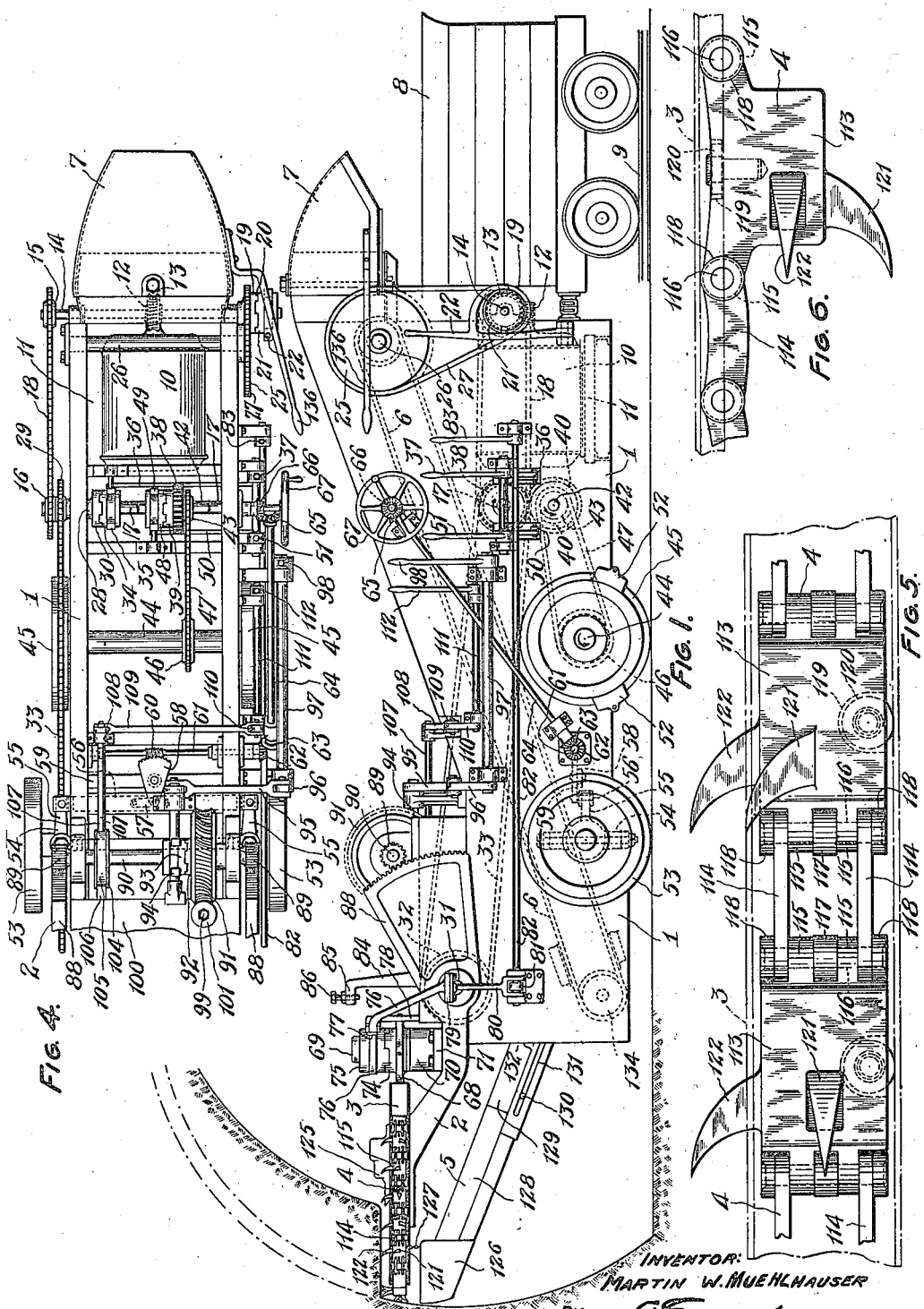
Fig. 1 is a side elevation of the machine from the side on which the controlling levers are mounted, showing the cutter in engagement with the mine wall and a pit car in position to receive the coal.

In the accompanying drawing the machine comprises a tractor carriage 1, carrying at its forward end a vertically swinging cutter frame 2 carrying a cutter chain guide portion 3 upon which travels an endless cutter chain 4. Beneath the frame 2 is suspended a receiving chute 5, which is pivoted to the forward end of the carriage 1, and delivers to an endless conveyor 6, which extends lengthwise of the carriage 1, and delivers through a swiveled chute 7 at the rear end of the carriage into a pit car 8 running on a track 9 or to one side of the track 9.

The entire mechanism is driven from a reversible motor 10 mounted on a platform 11 carried by the carriage 1 at the rear end thereof.

On the drive shaft of the motor is a worm 12, meshing with a worm gear 13 fixed to cross shaft 14. Adjacent its end and outside the framework of the carriage 1, the shaft 14 has fixed thereto a sprocket wheel 15 over which sprocket wheel, and a sprocket wheel 16 fixed to a second cross shaft 17, runs a sprocket-chain 18. Loosely mounted on the opposite end of the shaft 14 is a second sprocket wheel 19, having on the outer face thereof clutch teeth 20. Keyed to the shaft 14 outside said sprocket wheel 19 is a slidable jaw clutch member 21 which may be thrown into or out of engagement with the wheel 19 by means of the lever 22. Running over the sprocket 19 and over a sprocket 25 carried by the conveyor drive shaft 26 over which the endless conveyor 6 runs at its rear end, is a sprocket chain 27.

The operation of the conveyor 6 can be stopped at any time by operating the lever 22 to throw out the clutch member 21.

The cross shaft 17 has loosely mounted thereon a sleeve 28 carrying at one end the sprocket 29 and at its other end the jaw clutch member 30. At the forward end of the carriage 1 is a cross shaft 31 for driving the cutter chain 4 and for actuating the gearing for swinging the cutter frame 2. The shaft 31 has fixed thereto at its outer end a sprocket wheel 32. A sprocket chain 33 runs over the sprockets 29 and 32 to drive the shaft 31 from the shaft 17.

Keyed to the shaft 17 inside the clutch member 30, is a shiftable clutch member 34 provided with a bell crank shifter 35 connected by a link 36 with a lever 37 mounted on the side of the carriage 1. By shifting the lever 37 the shiftable clutch member 34 can be thrown into or out of engagement with clutch member 30 to drive the shaft 31 from the shaft 17 or to disconnect the shaft 31 from the shaft 17.

Loosely mounted on the shaft 17 is a gear pinion 38 carrying on one face a jaw clutch member 39 and meshing with a similar gear pinion 40 on a countershaft 42 below the shaft 17. Fixed to the countershaft 42 is a sprocket 43. The rear axle 44 of the carriage 1 on which are mounted the traction wheels 45, has fixed thereto a sprocket 46. Running over sprockets 43 and 46 is a sprocket chain 47 to drive the axle from the countershaft 42. Opposed to the clutch member 39 is a shiftable jaw clutch member 48 splined to the shaft 17. The clutch member 48 is shifted by means of a bell crank shifter 49 connected by a link 50 with a shifting lever 51 mounted on the side of the carriage 1. By shifting the clutch member 48 the driving axle 44 can be driven to advance or retract the carriage or disconnected to permit operation of the cutter chain and conveyor while the carriage is stationary. To hold the carriage against movement the traction wheels 45 are provided with brake shoes 52 of a well known type operated by the usual connections (not shown).

The front wheels 53 of the carriage 1 are mounted upon steering knuckles 54 having rearwardly extending arms 55 connected by a cross link 56. The cross link 56 is connected by means of a short link 57 to the worm segment 58 pivoted to the fixed cross bar 59. The worm segment 58 is engaged with a worm 60 carried by the cross shaft 61. Outside the side frame of the machine the shaft 61 has fixed thereto a bevel pinion 62 which meshes with a similar pinion 63 on the end of a rearwardly and upwardly extending shaft 64. The shaft 64 has a bevel pinion 65 at its upper end meshing with a bevel pinion 66 carried by the shaft of a hand wheel 67. By turning the hand wheel 67 the link 56 can be shifted to the right or left to turn the front wheels 55 to the desired angle.

Figure 2:
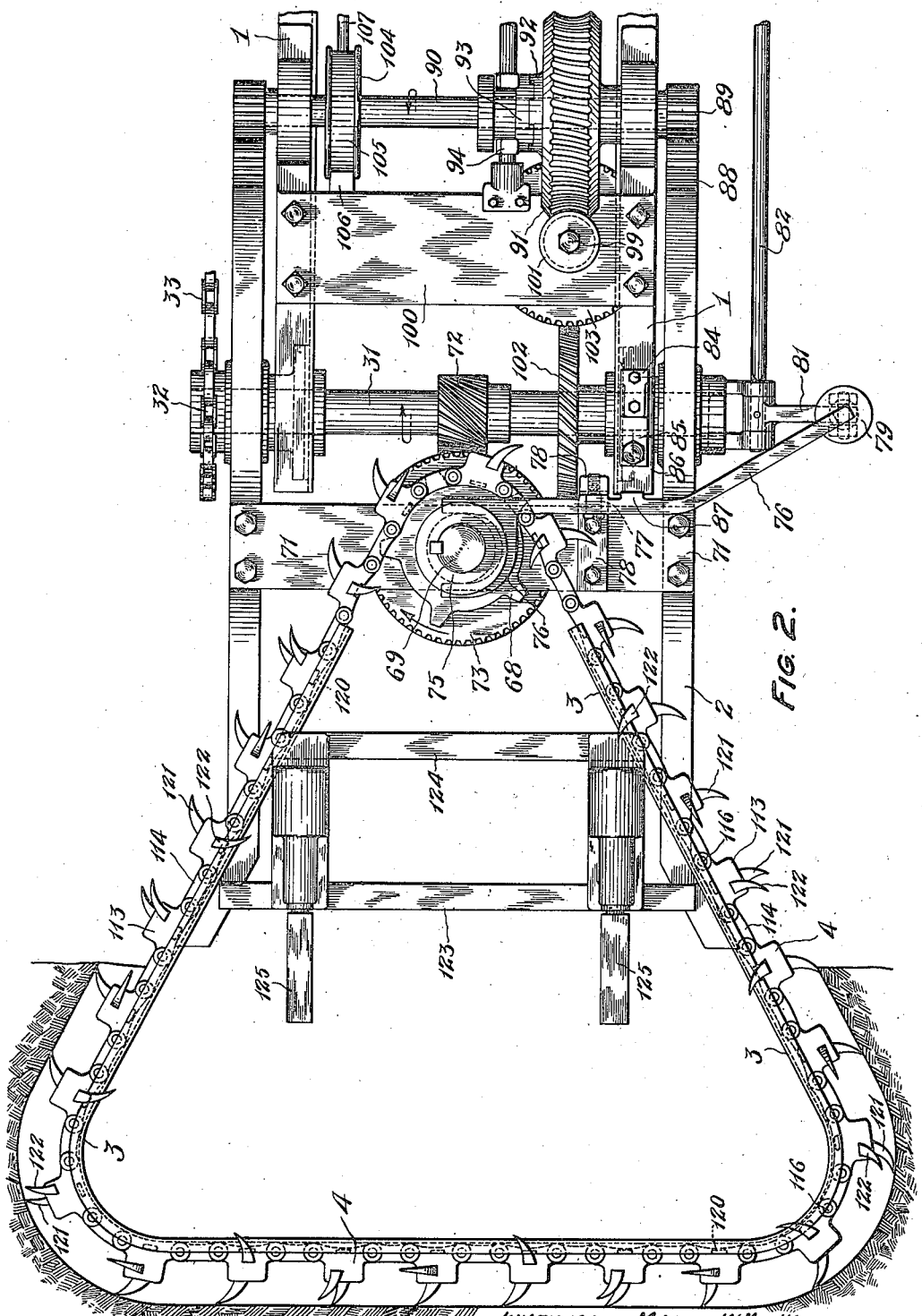
Fig. 2 is a top plan view of the forward end of the machine showing the endless cutter chain and open supporting frame therefor, the picks for breaking down the coal, and the gearing for driving the cutter chain and swinging the cutter frame vertically.

As clearly shown in Figs. 1, 2, and 3 the frame 2 is pivoted upon the shaft 31.

The cutter chain 4 is driven by means of a sprocket 68 about which the chain runs. The sprocket 68 is loosely mounted on an upright shaft 69 journaled in a bearing member 70 centrally supported on a cross plate 71 extending transversely across the swinging frame 2 closely adjacent to and parallel with the shaft 31. The shaft 69 is driven from the shaft 31 by means of intermeshing spiral gears, the gear 72 being fixed to the central portion of the shaft 31 and the gear 73 being fixed to the lower end of the shaft 69 below the cross plate 71. The upper face of the sprocket 68 has formed thereon clutch teeth 74. Splined upon the shaft 69 above the sprocket 68 is a complemental clutch member 75 having teeth engageable with the teeth 74 on the sprocket 68. The clutch member 75 is engaged by a forked lever 76 pivoted at 77 on a bracket 78 fixed to the cross plate 71. The outer end of the lever 76 is connected at its outer end by means of a ball and socket joint 79 to the upper end of a link 80 which is pivotally connected at its lower end to an arm 81 fixed to a shaft 82 which extends rearwardly along the side frame of the machine to adjacent the rear end of the machine; the shaft 82 has fixed to the rear end thereof an operating lever 83. By means of the lever 83 the lever 76 may be rocked about its pivot 77 to lift the clutch member 75 out of engagement with the clutch teeth 74 on the sprocket 68 and release the sprocket 68 to stop the cutter chain 4.

The outer end of the lever 76 extends downwardly and rearwardly so that when the clutch member 25 is in engaging position the ball joint 79 is positioned substantially at the pivotal axis of the frame 2. By reason of this arrangement the swinging movement of the frame 2 simply turns the lever 76 on the ball end of the link 80 without shifting the lever 76 on its pivot 77 or rotating the shaft 82.

In addition to providing means for manually disconnecting the cutter chain from its drive shaft I have provided means for automatically releasing the clutch member 75 when the cutter frame 2 has reached its uppermost position so that the cutter chain is not driven during the lowering of the frame 2. To this end I have mounted a bracket 84 on the forward end of the side frame of the machine. The bracket 84 has an arm 85 projecting forwardly into the path of movement of the arm 76 outside the pivot 77. The arm 85 carries set screw 86 engageable with a block 87 on the arm 76. By adjusting the set screw 86 the elevation at which the cutter chain is disconnected from its drive shaft may be varied. To hold the clutch 75 out of engagement during the lowering of the frame the friction of the operating connections is such that the clutch 75 when lifted will not drop back into engagement by gravity.

The frame 2 has fixed thereto a rack sector 88 with which meshes a pinion 89 fixed on a cross shaft 90. Loosely mounted on the cross shaft 90 is a worm gear 91 carrying on one face a jaw clutch member 92. Splined to the shaft 90 is an opposing shiftable jaw clutch member 93. For shifting, the clutch member 93 is provided with a bell crank shifter 94 connected by a link 95 to a crank arm 96 fixed to the rearwardly extending shaft 97 upon the rear end of which is fixed the operating lever 98.

The worm gear 91 and pinion 89 may be driven in either direction from the shaft 31, according to the direction of rotation of the motor 10, through a vertical countershaft 99 carried by a cross plate 100 on the carriage. The countershaft has fixed to its upper end a worm 101 meshing with the worm gear 91 and is driven from the shaft 31 by means of intermeshing spiral gears 102 and 103 fixed to the shafts 31 and 99, respectively. The shaft 90 is provided with a brake drum 104, carrying a brake band 105 which is anchored at one end to the frame of the machine by means of a plate 106. The brake band 105 is tightened or loosened on the drum 104 by means of a shaft 107 having oppositely threaded portions screwed into the ends of the band. The shaft 107 is turned to tighten or loosen the brake band by means of a crank arm 108 fixed thereto and connected by means of a link 109 with an arm 110 fixed to a shaft 111 extending along the side of the machine. Fixed to the rear end of the shaft 111 is an operating lever 112. When the lever 98 is operated to disconnect the shaft 90 the lever 112 will also be operated to operate the brake so that the cutter frame will be held in fixed position or permitted to fall slowly.

The guide portion 3 of the cutter frame 2 is in the form of an outwardly facing channel in which travels the chain 4. The chain 4 is made up of solid cutter bearing links 113 and intermediate links 114. The links 113 are provided at each end with a pair of knuckles 115 for receiving pintles 116. The ends of the intermediate links 114 fit against the outside of the knuckles. The pintles 116 pass through the knuckles 115 and the ends of the links 114 and carry central rollers 117 between the knuckles 115 and upper and lower rollers 118 outside the links 114. A portion of each of the cutter bearing links 113 is cut away at the inside lower edge at 119 to receive a roller 120. The rollers 117 and 118 run on the web of the channel 3 and the rollers 120 run on the lower flange thereof.

The cutter bearing links 113 of the cutter chain are solid blocks in the outer face of each of which is detachably mounted an outwardly and forwardly extending cutter 121, certain of said cutters extending straight forwardly, others being deflected upwardly and others downwardly. The upper face of each block link 113 carries an upwardly and forwardly extending detachable cutter 122. Certain of the last mentioned cutters extend outwardly and others inwardly. The cutters 121 clear a channel for entrance of the frame into the wall and the cutters 122 clear a channel for upward movement of the frame.

The guide portion 3 of the cutter frame consists of a channel member bent to substantially triangular form with its ends terminating just short of the sprocket 68, providing an open frame through which coal loosened by the cutters may fall. Mounted on cross members 123 and 124 between the opposite runs of the chain 4 are a plurality of pneumatically actuated picks 125 by means of which the depending block of coal partially severed by the cutters can be broken down into the chute.

The chute 5 is provided with a widened receiving portion 126 corresponding in shape and slightly wider than the cutting mechanism, and is suspended from the forward end of the machine by means of short link chains 127. The chute 5 comprises front and rear sections 128 and 129 telescopically connected by means of pins 130 carried by the forward section and sliding in slots 131 in the rear section. The rear section 129 has slotted plates 132 secured to its rear end. The slots in the plates 132 engage the pins 133 in the side plates of the carriage whereby the chute has a slidable and pivotal connection with the carriage.

The lower sprocket 134 of the endless conveyor 6 is located directly beneath the rear end of the chute 5 and a fixed inclined cross plate 135 over the lower end of the conveyor prevents leakage of coal between the chute and conveyor.

It will be noted that all controlling levers are mounted on one side of the machine at the rear so that they are all readily accessible to an operator standing beside the machine and that all exposed driving members are located on the opposite side of the machine so as not to endanger the operator or inconvenience him in the operation of the controlling members.

The discharge chute 7 has a rigid arm 136 attached thereto on the side adjacent the controlling levers so that the operator can direct the flow of coal from the conveyor.

In operation the cutter frame 2 will be lowered adjacent the floor, substantially as shown in Fig. 3. The clutch lever 37 will then be operated to throw in the clutch member 34 to drive the shaft 31 and through the spiral gears 72 and 73 the cutter chain 4. The clutch lever 51 will be shifted at intervals to engage the clutch member 48 with the clutch member 39 to drive the axle 44 forward as the cutters clear an opening into the mine wall.

If found desirable to obtain greater clearance in the cut, the hand wheel 67 can be shifted from time to time to swing the forward end of the machine slightly from side to side as the cut is made in the lower portion of the wall face. While cutting into the wall face, the flexible connection 127 between the chute 5 and cutter frame permits the cutter to drop into the chute as shown in dotted lines in Fig. 3 with forward edge of the guide frame slightly in advance of the forward edge of the chute. The cutter clears an opening through which the chute follows.

When the cutter frame has been entered sufficiently into the lower portion of the wall face, the lever 98 is operated to engage the clutch members 92 and 93 whereupon the pinion 89 operating on the rack sector 88 will swing the cutter frame 2 slowly upward. As the frame swings upward, the cutters 122 will clear a channel just wide enough for the cutter guides 3 leaving a column of coal separated from the wall at the sides and back within the guide frame. Pneumatic picks 6 will then be operated to break the coal down into the chute.

After the frame has swung upwardly a short distance coal will flow from the chute 5 onto the endless conveyor 6. The clutch lever 22 is then shifted to throw in the conveyor 6 and coal is delivered through the chute 7 to the pit car 8 or to one side of the track if desired, for instance, to avoid loading slate, rock or other foreign matter into the cars.

Sections will be added to the track 9 from time to time to permit the pit cars to be brought up to the rear of the machine.

After the upward swing of the cutter frame is completed the frame may be lowered by reversing the motor or the clutch lever 98 may be operated to free the clutch member 93 while the lever 112 is simultaneously operated to apply the brake. The tension on the brake band will be regulated by the lever 112 to control the rate of descent. The clutch member 75 will have been disengaged at the upper limit of movement of the frame 2 by the trip arm 85 and in case the frame 2 is lowered by reversing the motor 10 the cutter chains will not be driven.

What I claim is:

1. In a mining machine, a carriage; a cutter pivotally mounted on said carriage; means for swinging said cutter about its pivot; means for driving said cutter; and means operative upon a predetermined movement of the cutter to disconnect said cutter from its driving means.

2. In a mining machine; a carriage; a vertically swinging cutter frame having a peripheral guide channel; an endless cutter chain mounted in said channel; a drive sprocket for said chain; means for driving said sprocket; and means operative upon a predetermined movement of said frame to disconnect said sprocket from the driving means.

3. In a mining machine, a carriage, a vertically swinging cutter frame having a peripheral guide channel; an endless cutter chain mounted in said channel; a shaft carried by said frame; means for driving said shaft; a drive sprocket for said cutter chain mounted on said shaft; a clutch for connecting said sprocket to said shaft; manually operable means for shifting said clutch; and means operable upon a predetermined movement of said frame for shifting said clutch.

4. In a cutting chain for a mining machine, a series of cutter bearing link blocks, a series of intermediate links connecting said link blocks together, a cutting tool mounted in one edge of each link block, a roller pivoted in each block and projecting beyond the opposite edge thereof; and rollers pivoted in the ends of each block and projecting beyond the inner face thereof.

5. In a cutting chain for a mining machine, a support, a series of socket blocks, and a series of intermediate link members pivotally connected with said socket blocks, a cutting tool detachably secured in each socket block and extending beyond one edge thereof, the cutting edges of said tools constructed and arranged to cut a passage for said chain and its support, a roller pivoted in the edge of each socket block opposite said cutter, and rollers pivoted in the ends of each socket block and projecting beyond the inner face thereof, said rollers engaging said support.

6. In a cutting chain for a mining machine, a series of cutter bearing blocks; a series of connecting links, a cutting tool mounted in each cutter bearing block, said tools arranged to cut in advance of said chain; a series of rollers mounted in said cutter bearing blocks and projecting from the inner faces thereof, and a series of rollers mounted in said cutter bearing blocks and projecting from the inner edges thereof.

7. In a cutter for a mining machine, a channel iron guide; and an endless chain mounted in said guide, said chain comprising a series of cutter bearing block links, a series of intermediate connecting links, rollers pivoted in the ends of said block links and projecting from the inner face thereof to engage the web of the channel, and rollers pivoted to edges of the blocks and projecting from said edges to engage a flange of said channel.

Signed by me this 22nd day of January 1922.

MARTIN W. MUEHLHAUSER.